March 8, 1966     E. W. HARSLEM     3,238,719

LIQUID COOLED GAS TURBINE ENGINE

Filed March 19, 1963

INVENTOR.
ERIC W. HARSLEM
BY
Attorneys

United States Patent Office 3,238,719
Patented Mar. 8, 1966

3,238,719
LIQUID COOLED GAS TURBINE ENGINE
Eric W. Harslem, 2933 Lee Road,
Shaker Heights 20, Ohio
Filed Mar. 19, 1963, Ser. No. 266,275
5 Claims. (Cl. 60—39.55)

This invention relates to gas turbine engines and in particular to a liquid-cooled gas turbine engine.

In conventional gas turbine engines, air is used for cooling the combustor section and for reduction of combustion gas temperature to the level compatible with the properties of the materials used in the high temperature sections of the engine. Cooling air is supplied by the air compressor of the engine, which also furnishes the combustion air. Much more air is required for cooling than for combustion—typically the amount of air required for cooling is about three times that required for combustion, so that about 75 percent of the power developed is used to pump cooling air and is not available as useful power.

The present invention greatly reduces the proportion of power output which is used for cooling purposes, leaving a far greater proportion available as useful power. The invention exploits the higher pumping efficiencies obtainable in liquid pumps as compared to gas pumps, and also turns to advantage other familiar properties and characteristics of liquid coolants such as water. Among these properties or characteristics are high specific heat and the phenomenon of absorption of heat during change of state (heat of vaporation).

A general object of the present invention is to increase the amount of usable output power produced by a given size turbine system or, correspondingly, to achieve a given usable power output with a gas turbine system of less size and weight than previously required.

A feature of the invention is the continuous provision of a coolant in the liquid state between the center of the path of hot gases passing from the fuel combustion zone and the walls which confine the gases to flow in such path. Another feature is the pumping of air in amounts sufficient to support combustion but insufficient to maintain cooling throughout the power range of the turbine. In one optimal aspect of the invention, little or no air excess of that necessary to support combustion may be pumped.

These and others features of the invention and the objects and advantages thereof will be more fully understood from the following description taken together with the accompanying drawings, in which.

Figure 1:
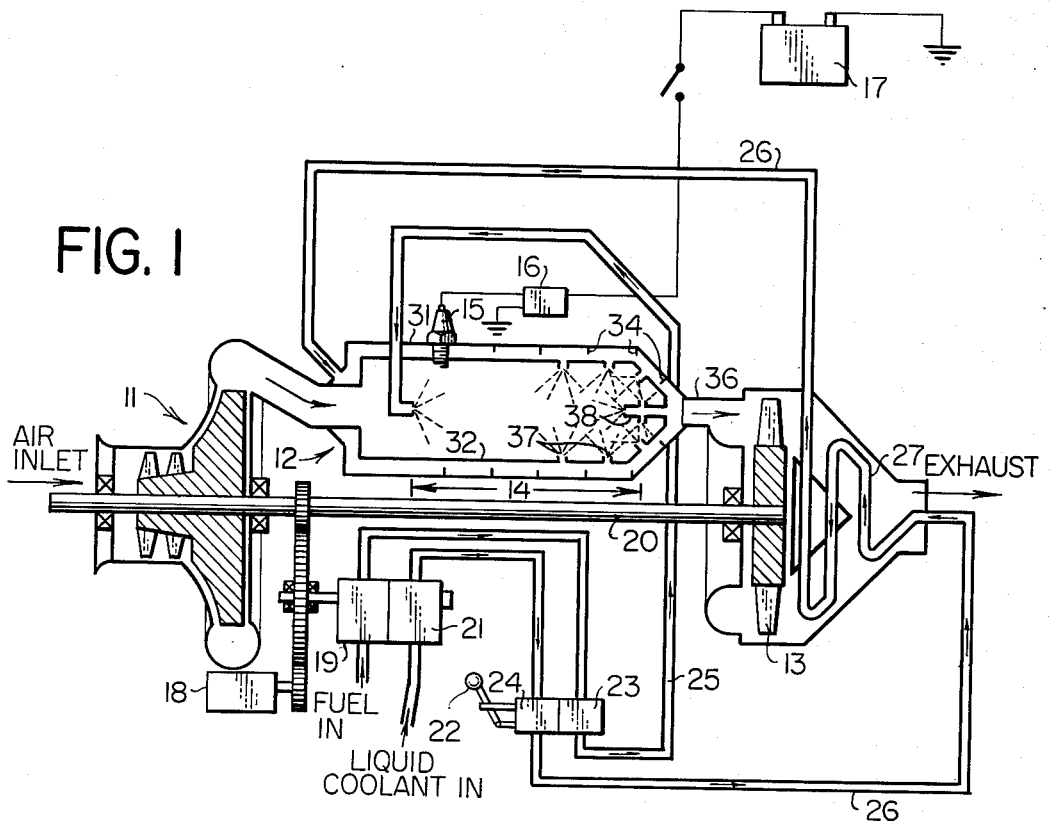
FIGURE 1 is a schematic showing of one example of a gas turbine engine embodying the invention.

The fuel-air turbine shown in FIGURE 1 comprises a compressor generally indicated by the reference numeral 11, at least one combustor generally indicated by the reference numeral 12, and a turbine wheel 13 driven by hot gases flowing from the zone of combustion 14. The zone of combustion may not be precisely defined but it is approximately within the zone indicated in the drawings.

The turbine engine may be provided with the usual accessories including a glow plug or a spark plug 15, a spark coil 16, and battery 17. Also provided are a fuel pump 19 and a coolant pump 21, both powered from the turbine shaft 20 which also drives the air compressor 11. A starting device 18 is provided.

Shaft 20 also serves as the power output member of the illustrated engine, but it is to be understood that the invention is equally applicable to free or power turbine engines where thrust provided by the turbine exhaust may comprise the major portion of the useful output of the engines. However the invention presently appears particularly appropriate for use as a prime mover or power source for emergency and stand-by power units where small size and light weight are desired. The invention also appears most appropriate for marine applications as a primary power source for outboard and inboard installations or as an auxiliary or secondary power unit. It also appears useful for mobile or secondary power plant applications or portable power units, such as but not limited to portable electrical generators and water pumping units for fire fighting. In such applications, the turbine shaft will comprise the principal or only power output medium.

Whether or not the turbine shaft is the principal power output medium, the turbine will have a given power range. In terms of this power range, the capacity of the compressor 11 is very small as compared to conventional fuel-air turbines. The capacity of the compressor 11 is sufficient to support combustion throughout the power range of the turbine, but is substantially insufficient to maintain air cooling of the turbine in the absence of other coolant. Preferably little or no air in excess of that necessary to support combustion may be pumped, but it may be better to err at least slightly on the side of excessive combustion air rather than on the side of a deficiency in combustion air, to thereby guard against undue fuel waste and other losses which can result if the supply of combustion air is inadequate.

As a typical example under conditions which may be encountered in practical operation, where the cooling air requirement is approximately three times that of the combustion air requirement, the capacity of the compressor 11 may be only approximately one-fourth that of a conventional fuel-air turbine of a comparable power range.

Associated with the fuel pump 19 is a coolant pump 21. The flow rates of the fuel and coolant are controlled by the associated valves 23 and 24, respectively, which may be controlled together by a single control member 22 so as to appropriately increase coolant flow in the coolant supply line 26 as higher power settings are achieved by raising the rate of fuel flow in fuel line 25.

In the illustrated device, to increase cycle efficiency, the coolant 26 flows through a heat exchanger section 27 at the gas outlet side of the turbine wheel 13 so that the temperature of the coolant is elevated toward its boiling point. Since this extraction of heat from the turbine gases occurs beyond the turbine wheel, no useful heat is consumed, and under many circumstances the exchange results in a net increase in cycle efficiency. The heat exchange can be eliminated when it does not achieve a worthwhile increase in cycle efficiency.

The coolant remains in a liquid state when it leaves the heat exchanger and arrives at the combustor 12 where it is received in a coolant jacket 31. The coolant jacket distributes the coolant around the combustor walls 32 which contain the hot gases of combustion and guide them along their flow path from the combustion zone to the turbine wheel. The coolant within the jacket 31 is maintained in the liquid state in wiping contact with the combustor walls 32 through which substantial heat transfer occurs. To prevent localized boiling, and the resulting development of hot spots, the interior of the jacket may be roughened or provided with baffle fins or rings 34, or other flow interference arrangements, to promote and maintain a sufficient degree of turbulence within the coolant jacket to assure good heat distribution and a substantially homogeneous liquid state of the coolant throughout the interior of the jacket.

The coolant passes radially interiorly of the walls 32 through the orifices 37 while in the liquid state. The liquid evaporates radially interiorly of the walls 32. The evaporation therefore occurs between the walls 32 and the center of the path of flow of the hot gases produced by the combustion. The heat of vaporization of the coolant is absorbed interiorly of the wall 32. The high specific heat of the coolant is of advantage in meeting the coolant requirements at and immediately downstream of the combustion zone, and particularly in achieving a sufficiently low temperature of the mixture of combustion gas and evaporated coolant flowing from the combustion zone through the unjacketed hot gas duct 36 and into the turbine manifold, through the nozzle block and turbine blades, and to exhaust. This temperature must of course be below the temperature limit of the material forming the duct 36.

A portion of the coolant passing down along the jacket 31 is not ejected through the sidewall means 32 but rather flows into a centrally located spray head 38 located in the approach section to the combustor outlet. This spray head 38 includes orifices as shown which spray into the central core of the combustion gases to contribute to cooling and particularly to promote uniformity of cooling of the gas as it flows to the hot gas duct 36 leading from the combustor outlet.

Figure 2:
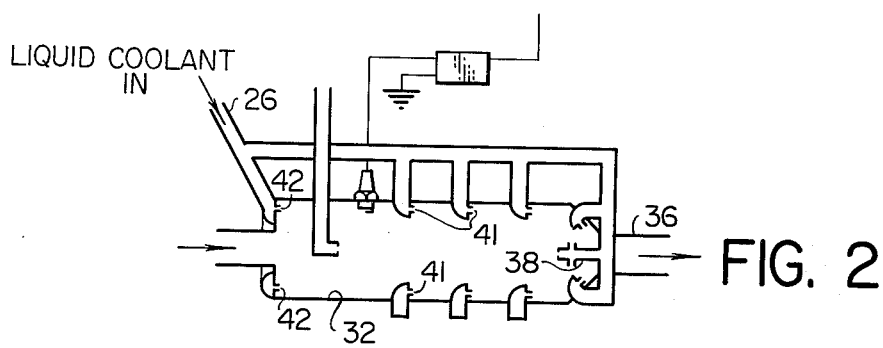
FIGURE 2 is a schematic view of an alternative combustor and coolant injection arrangement.

An alternative combustion coolant flow arrangement is shown in FIGURE 2. Here no jacket, as such, is provided for the combustor; but the walls 32, which contain the hot gases of combustion and guide them toward the gas duct 36 leading to the turbine wheel, are nevertheless wiped by coolant in the liquid state, although this wiping occurs interiorly of the wall means rather than primarily exteriorly thereof as in the previously described apparatus.

The coolant supply line 26 in FIGURE 2 is manifolded to a number of annularly and longitudinally distributed orifices 41, which open through the wall means 32 but are aimed longitudinally as shown. For simplicity of illustration only the uppermost and lowermost orifices 41 are illustrated in FIGURE 2, but it will be understood that a number of additional orifices are distributed around the sides of the wall means 32. Additional orifices (not shown) may also aim backwardly and in other directions. Swirling paths of coolant may be created by aiming the orifices in a skewed direction (not shown).

The coolant supply line is also manifolded to forwardly aimed orifices 42 toward the rear of the combustor.

Coolant flowing from the various orifices 41 and 42 is vaporized radially interiorly of the wall means 32 and between the wall means and the center of the hot core of combustion gases. The orifices 41 and 42 are aimed and spaced in such a way that the liquid coolant may wipe the interior of the wall means 32 before evaporating.

A portion of the fluid supply line is also manifolded as shown to a centrally located spray head 38 which is similar or identical to the same numbered element in the apparatus shown in FIGURE 1.

The invention is not restricted to the slavish imitation of each and every one of the details described above which have been set forth merely by way of example with the intent of most clearly setting forth the teaching of the invention. Obviously, devices may be provided which change, eliminate, or add certain specific details without departing from the invention.

What is claimed is:

1. In a fuel-air turbine of a given power range, at least one combustor having a zone of combustion, a turbine wheeel driven by hot gases flowing from the zone of combustion, wall means for containing the hot gases and guiding them along a path from the zone of combustion toward the turbine wheel, an air compressor of a capacity sufficient to provide, at constant speed operations, at least as much air as required for combustion throughout said power range and less air than required for cooling in the absence of other coolant, and means for continuously supplying said other coolant as a homogeneous liquiform mass of liquid coolant between said wall means and the center of said path, said homogeneous liquiform mass of liquid coolant comprising substantially all vaporizing coolant supplied to said combustor, whereby absorption of the heat of vaporization of the coolant is concentrated interiorly of the wall means.

2. A device as in claim 1 in which the coolant is water.

3. A device as in claim 1 in which said coolant supplying means includes a plurality of coolant orifices opening through said wall means, and means for feeding a homogeneous liquiform mass of liquid coolant inwardly through said orifices.

4. A device as in claim 1 in which said coolant supplying means includes means for maintaining a homogeneous liquiform mass of liquid coolant in wiping contact with said wall means.

5. A device as in claim 1 including heat exchange means on the gas outflow side of the turbine wheel for utilizing the heat of exhaust gases for elevating coolant temperature toward but not to the boiling point of the coolant.

References Cited by the Examiner

UNITED STATES PATENTS

| | | | |
|---|---|---|---|
| 2,168,313 | 8/1939 | Bichowsky | 60—39.55 |
| 3,021,673 | 2/1962 | Mock | 60—39.55 |
| 3,038,308 | 6/1962 | Fuller | 60—39.55 |

FOREIGN PATENTS 774,425   5/1957   Great Britain.

SAMUEL LEVINE, *Primary Examiner.*